United States Patent
Young et al.

(10) Patent No.: US 9,343,735 B2
(45) Date of Patent: *May 17, 2016

(54) SHARED ELECTRODE HYBRID BATTERY-FUEL CELL SYSTEM

(71) Applicant: Ovonic Battery Company, Inc., Rochester Hills, MI (US)

(72) Inventors: Kwo-hsiung Young, Troy, MI (US); Diana Wong, Sterling Heights, MI (US); Jean Nei, Southgate, MI (US); Benjamin Reichman, West Bloomfield, MI (US); Benjamin Chao, Troy, MI (US); William Mays, Commerce, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/251,962

(22) Filed: Apr. 14, 2014

(65) Prior Publication Data

US 2015/0295289 A1   Oct. 15, 2015

(51) Int. Cl.
| | |
|---|---|
| *H01M 12/08* | (2006.01) |
| *H01M 4/36* | (2006.01) |
| *H01M 4/38* | (2006.01) |
| *H01M 8/10* | (2016.01) |
| *H01M 10/34* | (2006.01) |
| *H01M 10/39* | (2006.01) |
| *H01M 14/00* | (2006.01) |
| *H01M 4/52* | (2010.01) |

(52) U.S. Cl.
CPC .............. *H01M 4/364* (2013.01); *H01M 4/383* (2013.01); *H01M 8/10* (2013.01); *H01M 10/347* (2013.01); *H01M 10/39* (2013.01); *H01M 14/00* (2013.01); *H01M 4/52* (2013.01); *H01M 2300/0071* (2013.01)

(58) Field of Classification Search
CPC ........ H01M 4/52; H01M 4/383; H01M 10/39
USPC .................................................. 429/400, 405
See application file for complete search history.

(56) References Cited

U.S. PATENT DOCUMENTS

| | | |
|---|---|---|
| 5,861,225 A | 1/1999 | Corrigan et al. |
| 2005/0126663 A1 | 6/2005 | Fetcenko et al. |
| 2012/0183835 A1 | 7/2012 | Young et al. |

FOREIGN PATENT DOCUMENTS

| | | |
|---|---|---|
| WO | WO-0169701 A1 | 9/2001 |
| WO | WO-2012106468 A2 | 8/2012 |

OTHER PUBLICATIONS

Fierro, C. et al., "The Influence of Nickel-Hydroxide Composition and Microstructure on the High-Temperature Performance of Nickel Metal Hydride Batteries," Journal of Electrochemical Society, 153(3) A492-A496 (2006).
Young, Kwo-hsiung et al., "The Current Status of Hydrogen Storage Alloy Development for Electrochemical Applications," Materials 2013, 6, 4574-4608.
Young, K., Metal Hydrides. In: Reedijik, J. (Ed.) Elsevier Reference Module in Chemistry, Molecular Sciences and Chemical Engineering, Waltham, MA: Elsevier. Dec. 27, 2013.

*Primary Examiner* — Ladan Mohaddes
(74) *Attorney, Agent, or Firm* — Dinsmore & Shohl LLP; Weston R. Gould

(57) ABSTRACT

A hybrid power cell is provided that combines a nickel-metal hydride battery, solid state hydrogen storage, and alkaline fuel cell technologies in a single cell operating within a targeted intermediate temperature range. A cell includes a cathode that is capable of using raw atmospheric air as an oxygen source and an anode that is capable of reversible electrochemical and gas phase hydrogen storage, where the anode and the cathode are highly functional at intermediate temperatures. The resulting hybrid power cell overcomes prior challenges of reliable high-capacity grid-tied energy storage necessary for greater renewable energy adoption.

7 Claims, 1 Drawing Sheet

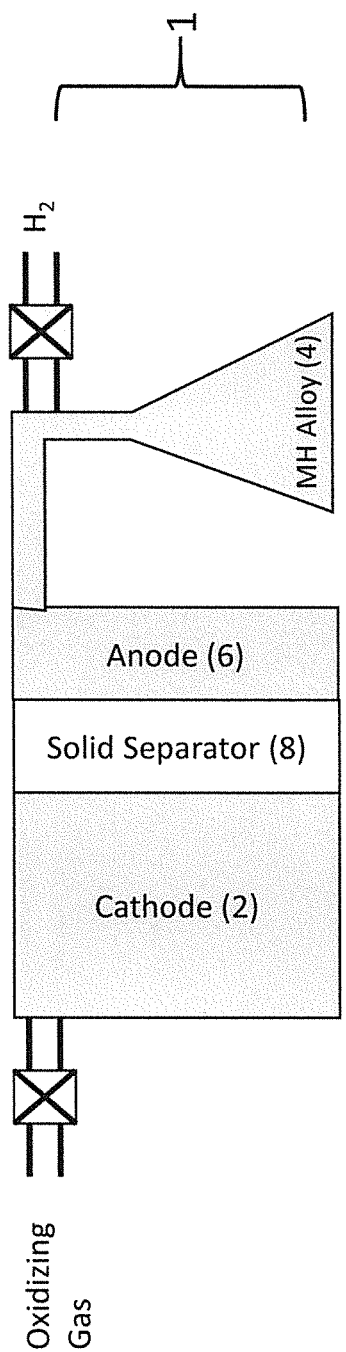

SHARED ELECTRODE HYBRID BATTERY-FUEL CELL SYSTEM

FIELD OF THE INVENTION

The invention relates to energy storage devices. More particularly, the invention relates to systems for storing energy and using that energy to provide continuous electrical power on demand and without a startup delay. The present invention effectively combines a battery and a fuel cell into a single device capable of intermediate temperature operation. The hybrid battery/fuel cell devices provide many advantages including higher energy/power density, lower initial cost, enhanced reliability, instant start, continuous operation, and power leveling capabilities.

BACKGROUND OF THE INVENTION

As the world's population expands and its economy grows, the rate at which atmospheric concentrations of climate changing carbon dioxide continues to rapidly increase. Fossil fuels are a causative factor in increasing pollution and in the strategic military struggles between nations. Also, fluctuating energy costs are a source of economic instability worldwide. In response, the global energy system is trying to move away from the carbon-rich fuels whose combustion produces harmful carbon dioxide. In the United States alone, it is estimated that the trend toward lower-carbon fuels combined with greater energy efficiency has reduced the amount of carbon released for each unit of economic production by nearly half.

Hydrogen is considered is a highly desirable fuel source in addressing the needs for global energy. Hydrogen is the most plentiful element in the universe (over 95%) and can therefore provide a virtually inexhaustible, clean source of energy for our planet. A fuel cell is an energy-conversion device that directly converts the energy of a supplied gas, such as hydrogen, into electrical energy. The base unit of the fuel cell is a cell having a cathode, an anode, and an appropriate electrolyte. Fuel cells have many current and potential applications such as supplying power for transportation vehicles, replacing steam turbines and power supply applications of all sorts. Despite their seeming simplicity, many problems have prevented the widespread usage of fuel cells.

Much of the initial focus in fuel cell research was directed to solid oxide fuel cell (SOFC) and proton exchange membrane (PEM) fuel cells. The SOFC has to be operated at around 1000° C. to obtain the high ionic conductivity of the solid-electrolyte which adds additional cost for thermal management of the system. The PEM fuel cell operates at 80-90° C., however, suffers from relatively low conversion efficiency and has many other disadvantages. For instance, the electrolyte for the PEM fuel cell system is acidic. Thus, noble metal catalysts are the only useful active materials for the electrodes of the system. Unfortunately, not only are the noble metals costly, they are also susceptible to poisoning by many gases, and specifically carbon monoxide (CO). Also, because of the acidic nature of the PEM fuel cell, the remainder of the materials used in the construction of the fuel cell need to be compatible with such an environment, which again adds to the cost of producing these systems. The PEM itself is quite expensive and its low conductivity at temperatures below 80° C. inherently limits the power performance and operational temperature range of the PEM fuel cell. The PEM membrane is sensitive to high temperatures, and begins to soften at 120° C. The membrane's conductivity depends on water and dries out at higher temperatures, thus causing cell failure. Therefore, there are many disadvantages to the PEM fuel cell which make it somewhat undesirable for commercial/consumer use. Both type of fuel cells require a substantial preparation time and cannot be started quickly.

The conventional alkaline fuel cell operated at room temperature has some advantages over PEM fuels cells in that alkaline fuel cells have higher operating efficiencies, use less expensive materials of construction, and have no need for expensive membranes. The alkaline fuel cell also has relatively higher ionic conductivity in the electrolyte, therefore, it has a much higher power capability. Unfortunately, conventional alkaline fuel cells still suffer from certain disadvantages. Conventional alkaline fuel cells often employ expensive noble metals catalysts in both electrodes, which, as in the PEM fuel cell, are susceptible to gaseous contaminant poisoning. The conventional alkaline fuel cell is also susceptible to the formation of carbonates from $CO_2$ produced by oxidation of the anode carbon substrates or introduced via impurities in the fuel and air used at the electrodes. This carbonate formation clogs the electrolyte/electrode surface and reduces/eliminates the activity thereof.

While fuel cells are important to addressing global warming by eliminating carbon dioxide production, existing technologies cannot effectively store energy produced by the vast majority of alternative energy production devices. Fuel cells, like batteries, operate by utilizing electrochemical reactions. Unlike a battery, in which chemical energy is stored within the cell, fuel cells generally are supplied with reactants from outside the cell. Thus, fuel cells still require an externally supplied gas source.

The energy storage that accompanies alternative energy power generation systems (solar, wind power, etc.) is typically a battery system. Each of these alternative energies represents a discontinuous source of electrical energy in that they are effective only as long as their power source is active. For example, solar energy sources function only in daylight hours, and have peak operating performance only in direct sunlight and in the absence of cloud cover. Wind power is highly weather dependent and while many areas experience more regular winds, even these areas suffer low wind levels at least during some point of each day.

In order for each of the alternative energy generation systems to provide power on a continuous basis, energy produced during operating hours must be captured in a battery system for later use. The size of the battery system needed to guarantee continuous operation of these alternative energy systems is, however, enormous. For example, in an isolated desert environment, a minimum of 72 hours of battery storage is required. Fuel cells can supplement the battery system in this case to reduce the battery storage requirement down to 16 hours. Including existing fuel cells in an alternative energy generation system, however, significantly adds to the cost and complexity of such systems. Moreover, fuel cells alone cannot store energy or level the power output from alternative energy generation sources without the assistance from a battery or supercapacitor.

As such, there is a need for an alternative energy production system that is capable of continuous power supply and effectively couples with existing and future alternative energy production systems.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Adopting renewable or alternative energy sources has been hampered by the irregular nature of forces necessary to power such systems. Solar power is optimal only when a collection device is situated toward the sun in clear conditions. Power output falls off dramatically when the sun is hidden by clouds or at night. Wind power is at the mercy of frontal systems and other weather parameters that offset the full potential of wind turbines in even the most reliable of locations. While geothermal energy is far more regular in its ability to generate power, the locations for siting a geothermal power plant are relatively rare.

The provided intermediate temperature power cell of the present invention solves many of the issues of irregular power generation observed with alternative energy sources. The intermediate temperature hybrid cell is capable of storing electrical energy in the form of hydrogen for later consumption during times of power need but low generation in addition to functioning as a battery. Further, the cell is capable of utilizing external hydrogen as fuel for continuous operation for long periods. The cell provides greatly improved reliability and simplicity that both reduces the cost and increases the lifetime of the system.

Provided is an intermediate temperature hybrid power cell including a cathode that includes: one or more cathode materials capable of absorbing and desorbing hydrogen, the cathode material including a mixed metal oxide capable of being oxidized by air; an anode formed of one or more anode materials, the anode material capable of reversible electrochemical and gas phase hydrogen charge; wherein the anode material and the cathode material are in electrochemical contact and wherein the anode and the cathode function as electrodes in a battery, a fuel cell, or both, at an intermediate temperature of 100 degrees Celsius to 700 degrees Celsius, optionally 200 degrees Celsius to 500 degrees Celsius.

Some embodiments further include a hydrogen storage alloy or hydrogen source, the hydrogen storage alloy or hydrogen source in gaseous contact with the anode. The hydrogen storage alloy is optionally separated from the anode by a hydrogen gas transferring conduit or a proton conducting membrane.

An anode for use in an intermediate temperature hybrid power cell optionally includes two or more anode materials. A second anode material is optionally capable of fast-rate hydrogen discharge at temperatures between 200 and 250° C. In some embodiments, a second anode material is a Fe-doped Mg alloy. An anode material optionally includes or is solely formed from anode material particles of 0.1 to 2 micrometers in cross sectional dimension. Anode material particles are optionally spherical or substantially spherical.

An anode material optionally includes material with an $AB_x$ composition, where A=alkaline earth, rare earth, column 4B and 5B, B contains at least one from transition metal other than column 4B and 5B, and elements from column 4A and 5A, and x is between 0.5 and 6. Optionally, an anode material includes a: BCC phase metal hydride alloy; Mg or Ca based MH alloy; $Mg_2Ni$ based metal hydride alloy; ZrNi based metal hydride alloys; I-III alloy; rare earth metal based metal hydride alloy; or combinations thereof. An anode material is optionally a BCC phase metal hydride alloy selected from the group consisting of V—Ti—Cr based alloy and a Laves-phase alloy.

An intermediate temperature hybrid power cell optionally includes a cathode material that is capable of multi-electron transfer (more than 1 electron transfer per transition metal atom). Optionally the cathode material includes one or more nickel hydroxide materials.

An intermediate temperature hybrid power cell includes an electrolyte. An electrolyte is optionally a solid electrolyte. In some embodiments, an electrolyte includes one or more perovskite-like materials.

An intermediate temperature hybrid power cell optionally includes a hydrogen source that is in gaseous contact with an anode material, a hydrogen storage material, or both. In some embodiments, the cathode of an electrochemical cell is in gaseous contact with an oxygen source, optionally raw atmospheric air or atmospheric quality air.

The resulting intermediate temperature power cell has the advantages of instant start, load matching, effectively storing energy from an alternative energy source, providing power generation in suboptimal weather and other conditions, low cost to both install and operate, and long expected lifetimes.

BRIEF DESCRIPTION OF THE DRAWINGS

FIG. 1 is a schematic of a hybrid power cell according to one embodiment of the invention.

DETAILED DESCRIPTION OF EMBODIMENTS OF THE INVENTION

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various materials, elements, components, regions, layers, and/or sections, these materials, elements, components, regions, layers, and/or sections should not be limited by these terms. These terms are only used to distinguish one material element, component, region, layer, or section from another material, element, component, region, layer, or section. Thus, a first "material," "element," "component," "region," "layer," "section" discussed below could be termed a second (or other) material, element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Provided is a hybrid power cell capable of full and efficient functionality at intermediate temperatures. The hybrid power cell combines the elements of a fuel cell with that of a battery into a single device capable of both storing and instantly utilizing stored chemical energy. As such, the present invention is a significant step forward in addressing clean energy needs.

A hybrid power cell according to the invention is capable of functioning in a battery mode or a fuel cell mode in a single device and utilizing a single pair of electrodes. The hybrid power cell optionally operates in an intermediate temperature range to improve battery energy and power performance while also eliminating the need for an air electrode with expensive catalysts within a fuel cell. The hybrid power cell includes two operating modes: a fuel cell mode; and a battery mode. Supplying fuel in the form of hydrogen gas and air when operating in the fuel cell mode serves to charge the anode with hydrogen while at the same time oxygen provided from air or other source simultaneously oxides the cathode ($Ni(OH)_2$, for example) to a higher oxidation state (NiOOH), essentially charging the device for power generation when switched to battery mode. The elimination of the traditional fuel cell air electrode not only reduces the complexity and cost of the cathode, but also prolongs the lifetime of the system.

Several advantages of the hybrid power cell over other designs are summarized in Table 1.

A schematic of an intermediate temperature hybrid power cell according to one embodiment is shown in FIG. 1. A cell 1 can function in either a battery mode, or a fuel cell mode and is capable of instant switching between the two modes. In battery mode, energy optionally obtained from the grid or from another power source such as an alternative energy source, is stored in a cathode 2 and a hydrogen storage alloy 4. Energy can be fed back to the grid by the following reversible electrochemical reaction of Formula I:

$$Ni(OH)_2+M \leftrightarrow NiOOH+MH \leftrightarrow NiOOH+M+\tfrac{1}{2}H_{2(g)} \quad \text{(Formula I)}$$

A cell further includes an anode 6 in electrochemical contact with the cathode 2. The anode is capable of reversible electrochemical and gas phase hydrogen charge. Between the anode 6 and the cathode 2 is a solid separator 8. The solid separator 8 is a proton conductor. In case of continuous energy generation, low pressure hydrogen gas can be supplied by several methods to charge the hydrogen storage alloy through a gaseous phase reaction. Simultaneously, the cathode is optionally oxidized by air or other oxygen source yielding continual usage and governed by the reaction according to Formula II:

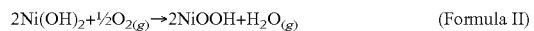
$$2Ni(OH)_2+\tfrac{1}{2}O_{2(g)} \rightarrow 2NiOOH+H_2O_{(g)} \quad \text{(Formula II)}$$

An intermediate temperature hybrid power cell includes a cathode. A cathode is made at least in part from a cathode material capable of absorbing and desorbing hydrogen. Optionally, a cathode material includes a mixed metal oxide capable of being oxidized by air. In some embodiments, a cathode material includes a metal oxide that is optionally modified chemically to provide multi-electron transfer extending beyond the customary one electron per metal atom capacity even in an aqueous electrolyte at ambient temperature. In some embodiments, a cathode material includes a high valence transition metal oxide illustratively $Mn_2O_7$, $MnO_2$, $Fe_2O_3$, $CoO_2$, $NiO_2$; a hydroxide from a transition metal illustratively $Mn(OH)_2$, $Fe(OH)_3$, $Co(OH)_3$; an oxihydroxide from a transition metal, illustratively CoOOH or NiOOH; an oxide of mixed metal illustratively (Mn, Co, Ni)$O_x$, (Mn, Al, Ni)$O_x$, $LiMn_2O_4$; a hydroxide of mixed metal illustratively (Mn, Co, Ni)(OH)$_x$, (Mn, Al, Ni)(OH)$_x$, (Li, Ni)(OH)$_x$, (Li, Mn)(OH)$_x$; or other materials capable of multi-electron transfer such as $HFePO_4$, $HMnPO_4$, $HFeSO_4$, $HMnSO_4$. Additional illustrative metal oxide materials are found in U.S. Pat. No. 5,861,225. Combinations of cathode materials are optionally used in a cathode.

TABLE 1

Comparison of energy storage/generation for grid applications.

| System | Instant Start | Load-matching | Alternative energy storage | Generation during cloudy days | Cost | Expected life |
|---|---|---|---|---|---|---|
| Battery only | ✓ | ✓ | ✓ | | High | Long |
| Fuel-cell only | | | | ✓ | Low | Med. |
| Fuel-cell with instant start | ✓ | ✓ | | ✓ | Low | Med. |
| Fuel-cell plus separate battery | ✓ | ✓ | ✓ | ✓ | Med | Med. |
| Hybrid Power System | ✓ | ✓ | ✓ | ✓ | Low | Long |

The term "substrate" as used herein relates to any electronically conductive network, foam, grid, plate or foil made from any electrically conductive material. A substrate illustratively includes conventional nickel foils, plates and foams, as well as, carbon networks, fibers or particulate and cobalt oxyhydroxide networks.

A cathode material optionally contacts (e.g. by coating, layering, or other contact) an electrically conductive substrate to form a cathode.

An intermediate temperature hybrid power cell further includes an anode. An anode include an anode material capable of reversible electrochemical and gas phase hydrogen charge. As such, an anode may function by being supplied by hydrogen obtained from an external hydrogen source, a cathode material, an electrolyte, a hydrogen storage alloy, or any combination thereof. An anode material optionally contacts (e.g. by coating, layering, or other contact) an electrically conductive substrate.

An anode material is capable of both electrochemical and gas phase hydrogen charge/discharge at intermediate temperatures. An intermediate temperature is optionally from 100° C. to 700° C., or any value or range therebetween. Excellent results are obtained using sub-ranges. As such, an intermediate temperature is optionally from 200° C. to 500° C. Optionally, an intermediate temperature is from 200° C. to 250° C.

An anode material is optionally a metal hydride (MH). Illustrative examples of MH includes particles of MH material. Particles of MH material optionally have a cross sectional dimension of 0.1 to 2 micrometers. Optionally, particles of MH are spherical or substantially spherical. Anode materials are optionally formed by a gas atomization technique. Illustrative gas atomization techniques are described in K. Young, et al, *Journal of Alloys and Compounds* 2011, 509, 4896; and K. Young, et al., *International Journal of Hydrogen Energy* 2011, 36, 3547.

An anode material optionally includes multiple anode materials. Optionally, an anode material includes 1, 2, 3, 4, 5, or more anode materials or alloys. Optionally, an anode material includes a material having an $AB_x$ composition where A=alkaline earth, rare earth, colume 4B and 5B, B contains at least one from transition metal other than column 4B and 5B, and elements from colume 4A and 5A, and x is between 0.5 and 6. In some embodiments, an anode material includes a: BCC phase metal hydride alloy illustratively a V—Ti—Cr based alloy and a Laves-phase alloy; Mg or Ca based MH alloy; $Mg_2Ni$ based metal hydride alloy; ZrNi based metal hydride alloys; I-III alloy; rare earth metal based metal hydride alloy; or combinations thereof. Illustrative specific anode materials can be found in K. Young and J. Nei, *Materials* 2013, 6, 4574.

Optionally, a second anode material is included either intermixed with a first anode material, contacting a first anode material, or otherwise in contact with a first anode material so as to be capable of hydrogen transfer from a first anode material to a second anode material. A second anode material is optionally capable of fast-rate hydrogen discharge at temperatures between 200 and 250° C., where fast-rate in the context of a second anode material is defined as discharging 80% of its full capacity in 80 minutes or less. A second anode material is optionally a Fe-doped Mg alloy.

Electrochemical and gas phase hydrogen charge/discharge by an anode material is optionally accomplished by anode structures alone or in combination with an external hydrogen storage alloy. Illustratively, an anode includes a single anode material that functions as both a hydrogen storage medium and for electrochemical charge/discharge. Optionally, an anode is a laminated composite material with two layers of different MH alloy intimately connected to each other where a first MH alloy functions as an anode material, and a second MH alloy functions as a hydrogen storage material. Optionally, an anode material is associated with a hydrogen storage material via a proton conducting membrane or solid film such that hydrogen can be readily exchanged between a hydrogen storage alloy on one side of the film and an anode material located on the other side of the film.

An anode material is in electrochemical contact with a cathode material by an intermediate electrolyte. While typical metal hydride battery structures employ a classic potassium hydroxide alkaline electrolyte, the inventive cell optionally excludes KOH as an electrolyte. Optionally, a cell includes a solid electrolyte composition. Replacing liquid electrolyte with solid-state film enables the increase in cathode voltage, eliminates oxygen evolution, and increases the overall capacity. Increasing the operation temperature from room temperature to the intermediate temperature range increases the proton conductivity by a factor of at least 10. A solid electrolyte optionally has a thickness that is less than 15 micrometers, optionally less than 10 micrometers, optionally 5 micrometers or less.

Illustrative examples of an electrolyte material include a perovskite-like solid electrolyte optionally as described in US Patent Application Publication No: 2012/0183835. In some embodiments, an electrolyte is a liquid electrolyte. Specific examples of an electrolyte include but are not limited to: perovskite zirconium oxides such as $BZYO=BaZr(x)Y(1-x)O(2.5+x/0.2)$; metal halide perovskites such as $AMX3$ where X=halide; mixed metal oxides/polymers such as sulfonated tetrafluoroethylene copolymer derivatives, among others; phosphate-based ceramics; solid acids, illustratively $K_3H(SO_4)_2$, $CsH_2PO_4$, $RbH_2PO_4$, or $LiH2PO4$; phosphoric acid-doped PBI; ionic liquids such as [dema][TfO], $EtMeImBF_4$/SPAEK-6F, [bmim][TfO]/Nafion; molten salts; or combinations thereof.

$ABO_{3-\delta}$ perovskite, where A is a rare-earth element or an element with a large radius and B is an element with a smaller radius, is capable of proton conduction as serves as one example of an electrolyte. The structure of such an oxide, if prepared under proper conditions, is prone to a large density of oxygen vacancies. When such an electrolyte reacts with water, oxygen from the water occupies a vacancy, and the remaining two protons are then attached to two separate oxygen ions, which create a proton-conducting path substantially as described by R. A. Davies, et al., *Solid State Ionics* 1999; 126; 323. The proton conductivity depends on the vacancy density and also the distance between neighboring oxygen ions.

$Ni(OH)_2$/NiOOH type materials are optional cathode materials in a hybrid power cell. In some embodiments a $(Ni, Co, Zn)(OH)_2$ spherical powder produced by co-precipitation in a single reactor is used as a cathode material. C. Fierro, et al., *Journal of electrochemical Society* 153 (2006) A492. The use of aqueous KOH solution as electrolyte limits the potential of the cathode to lower than 0.4 V vs. Hg/HgO. However, the use of solid electrolyte loosens the restriction in voltage and allows the use of $Ni(OH)_2$ up to at least $NiOOH_{0.33}$, which yields a 66% increase in capacity. Thus, and electrolyte is optionally a solid electrolyte.

A hybrid power cell according to some embodiments of the invention includes a hydrogen storage alloy. The hydrogen storage alloy is optionally intermixed with an anode material, physically contacting an anode material, separated from an anode material by a hydrogen conducting membrane or film, or is located remote from an anode material but in gaseous contact with the anode material. FIG. 1 illustrates an embodiment where a remote hydrogen storage element is provided that includes a hydrogen storage alloy 4 in gaseous contact with an anode material 6 where gaseous contact is optionally controlled by a valve. As such, hydrogen can be readily transferred between an anode material and a hydrogen storage alloy such as in the condition of charging with power provided by an external power source (e.g. solar, wind, grid, or other). Similarly, hydrogen can be readily transferred from a hydrogen storage alloy to an anode material in a discharge condition illustratively when the cell is functioning as a fuel cell. A hydrogen storage alloy is optionally a Mg-based alloy capable of fast-rate discharge at temperatures between 200 and 250° C. One example of a hydrogen storage alloy is a Fe-doped Mg alloy that previously achieved 90% full capacity absorption (7.8 wt. %) at 240° C. U.S. Patent Application 2005/0126663.

A hybrid power cell according to some embodiments of the invention includes a hydrogen source. A hydrogen source is in gaseous contact with a hydrogen storage alloy, an anode material, or both. Optionally, a hydrogen source is regulated by a valve that regulates the transfer of hydrogen to the hydrogen storage alloy the anode material, or both. When the valve is in the open condition it will supply hydrogen to the system or part thereof for charging or for operation as a fuel cell. When the valve is in the closed condition, the cell can operate in fuel cell mode using the hydrogen stored in the charged hydrogen alloy material or may simply function in battery mode. A hydrogen source is optionally purified hydrogen. A hydrogen source is optionally a rough hydrogen source.

The inclusion of an external hydrogen source will allow the hybrid power cell to function in fuel cell mode indefinitely. In fuel cell mode, hydrogen is supplied by the hydrogen source or the hydrogen storage alloy, or both, while the cathode is continually oxidized by a reaction with an oxygen source such as air. An oxygen source is optionally connected to a cell via a conduit suitable for carrying gas. Optionally, a valve is present between an oxygen source and a cell body to allow for switching between fuel cell and battery modes.

A hybrid power cell according to the invention includes an oxidizing gas source in gaseous contact with a cathode material. Oxygen is optionally supplied by a purified or substantially purified oxygen source. The present invention when using particular cathode materials as described (e.g. mixed metal oxides) herein are capable of using air as an oxidizing gas to provide the necessary oxygen to oxidize the cathode material to a higher oxidation state (NiOOH) during a charging process. Thus, true dual-battery/fuel cell behavior at both electrodes is possible. Furthermore, elevated-temperature operation in the intermediate temperature range accelerates the cathode reaction kinetics.

By using an intermediate operating temperature and utilizing alternatives to the customary KOH electrolyte, operation of a hybrid power cell in the fuel cell mode is compatible with atmospheric-quality air. The two main modes of operation for a hybrid power cell are fuel cell mode for periods when power generation via solar or wind is idle (or other low power input times), and battery mode for storing excess energy generated by solar or wind. Fuel cell mode can be operated asynchronously using two sub-stacks as is traditionally done, but a single stack utilizing the direct reaction with oxygen in air simplify the overall system design may be used with the provided intermediate temperature hybrid power cell.

A hybrid power cell is optionally contained in a housing. Any housing suitable for containing a cell including the anode, cathode, and electrolyte may be used. A housing optionally is in contact with an oxygen source and a hydrogen source, each independently via an intermediate valve. The housing is optionally electrically connected to a power source such as an electrical grid, solar panel, wind power source, hydropower source, geothermal power source, or other alternative or green energy source. Known methods of including a rechargeable cell in a housing are operable.

Among the numerous advantages of the hybrid power cell as provided is its ability to handle dynamic loads and transients essentially as a battery. While there is an increased weight contribution from the storage materials to the stack, the materials are in a form that is electrochemically favorable for high power capability without the high cost of noble metals. There is also no need to adjust flow rates to match load response in this type of system, as the energy is stored locally in the electrodes.

Various modifications of the present invention, in addition to those shown and described herein, will be apparent to those skilled in the art of the above description. Such modifications are also intended to fall within the scope of the appended claims.

REFERENCE LIST

[1] K. Young, J. Nei, Materials 2013, 6, 4574.
[2] K. Young, T. Ouchi, A. Banik, J. Koch, M. A. Fetcenko, L. A Bendersky, K. Wang, M. Vaudin, Journal of Alloys and Compounds 2011, 509, 4896
[3] K. Young, T. Ouchi, A. Banik, J. Koch, M. A. Fetcenko, International Journal of Hydrogen Energy 2011, 36, 3547
[4] K. Young, T. Ouchi, M. A. Fetcenko, Journal of Alloys and Compounds 2008, 480, 428.
[5] M. A. Fetcenko, K. Young, C. Tung, S. R. Ovshinsky, U.S. Patent Application 20050126663 (2005)
[6] K. Young, M. A. Fetcenko, U.S. Patent Application 20120183835 (2012)
[7] D. Corrigan, C. Fierro, F. J. Martin, S. R. Ovshinsky, L. Xu, U.S. Pat. No. 5,861,225
[8] S. R. Ovshinsky, S. Venkatesan, A. Boyko, S. K. Dhar, K. Fok, T. Hopper, U.S. Pat. No. 6,703,156 (1999)
[9] B. Reichman, M. A. Fetcenko, S. R. Ovshinsky, K. Young, W. Mays, J. Strebe, U.S. Pat. No. 7,727,662 (2010)
[10] M. A. Fetcenko, S. R. Ovshinsky, K. Young, U.S. Pat. No. 7,494,739 (2009)
[11] M. A. Fetcenko, S. R. Ovshinsky, K. Young, U.S. Pat. No. 7,132,193 (2006)
[12] K. Young. In: Reedijk, J. (Ed.) Elsevier Reference Module in Chemistry, Molecular Sciences and Chemical Engineering. Waltham, Mass.: Elsevier. 27 Dec. 2013 doi: 10.1016/B978-0-12-409547-2.05894-7.
[13] K. D. Kreuer, Annu. Rev. Mater. Res. 33 (2003) 333.
[14] R. A. Davies, M. S. Islam, J. D. Gale, Solid State Ionics 126 (1999) 323.
[15] A. K. Ivanov-Schitz, A. B. Bykov, Solid State Ionics 100 (1997) 153.
[16] C. Fierro, A. Zallen, J. Koch, M. A. Fetcenko, Journal of electrochemical Society 153 (2006) A492.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. An intermediate temperature hybrid power cell comprising:
   a cathode comprising a cathode material capable of absorbing and desorbing hydrogen, said cathode material comprising a mixed metal oxide/hydroxide capable of being oxidized by air;
   an anode comprising a first anode material, said first anode material capable of reversible electrochemical and gas phase hydrogen charge;
   said anode material and said cathode material in electrochemical contact;
   said anode and said cathode functioning simultaneously as electrodes in both a battery and a fuel cell at an intermediate temperature of 200 degrees Celsius to 500 degrees Celsius.

2. The cell of claim 1 wherein said anode comprises a second anode material comprising a Fe-doped Mg alloy capable of absorbing and desorbing hydrogen.

3. The cell of claim 1 further comprising a solid electrolyte separating said cathode from said anode.

4. The cell of claim 3 wherein said solid electrolyte comprises a perovskite-like oxide material.

5. The cell of claim 1 further comprising a hydrogen storage alloy in gaseous contact with said anode.

6. The cell of claim 5 said hydrogen storage alloy directly contacting said anode material, separated from said anode material by a gas conducting conduit, or separated from said anode material by a proton conducting membrane.

7. The cell of claim 1 wherein said air is earth atmospheric quality air.

* * * * *